United States Patent
Shiels et al.

(10) Patent No.: US 12,403,800 B2
(45) Date of Patent: Sep. 2, 2025

(54) AIRCRAFT SEAT WITH CAM FOLLOWERS

(71) Applicant: Safran Seats GB Limited, Cwmbran (GB)

(72) Inventors: Christopher Shiels, Cwmbran (GB); Clive Pearce, Cwmbran (GB); Louis Flanagan, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 162 days.

(21) Appl. No.: 17/630,295

(22) PCT Filed: Jul. 17, 2020

(86) PCT No.: PCT/GB2020/051720
§ 371 (c)(1),
(2) Date: Jan. 26, 2022

(87) PCT Pub. No.: WO2021/023967
PCT Pub. Date: Feb. 11, 2021

(65) Prior Publication Data
US 2022/0267008 A1 Aug. 25, 2022

(30) Foreign Application Priority Data

Aug. 7, 2019 (GB) .................................. 1911277

(51) Int. Cl.
*B60N 2/22* (2006.01)
*A47C 1/032* (2006.01)
(Continued)

(52) U.S. Cl.
CPC .......... *B60N 2/2236* (2013.01); *B64D 11/064* (2014.12); *B64D 11/0641* (2014.12); *F16H 53/06* (2013.01)

(58) Field of Classification Search
CPC .......................... B60N 2/2236; B64D 11/064; B64D 11/0641; B64D 11/0639; F16H 53/06; A47C 1/03294
See application file for complete search history.

(56) References Cited

U.S. PATENT DOCUMENTS

| 1,426,170 | A | * | 8/1922 | Frantz | ..................... E05D 15/12 49/260 |
| 1,689,665 | A | * | 10/1928 | Cramp | ................ E05D 15/0639 16/103 |

(Continued)

FOREIGN PATENT DOCUMENTS

| DE | 3810129 A1 | 10/1989 |
| EP | 0869061 A2 | 10/1998 |

(Continued)

OTHER PUBLICATIONS

International Patent Application No. PCT/GB2020/051720, International Search Report and Written Opinion, dated Oct. 30, 2020.

(Continued)

*Primary Examiner* — Robert Canfield
(74) *Attorney, Agent, or Firm* — Kilpatrick Townsend & Stockton LLP

(57) ABSTRACT

The present invention concerns an aircraft seat. The aircraft seat comprises at least one moveable element, and a cam follower arrangement associated with the moveable element. The cam follower arrangement comprises a first cam follower and second cam follower attached to a common bogie. Spreading the load over two cam followers attached to a common bogie may reduce the wear on each individual cam follower. This reduction in wear may result in fewer maintenance tasks associated with the aircraft seat, and may make the aircraft seat more robust.

7 Claims, 5 Drawing Sheets

(51) Int. Cl.
*B64D 11/06* (2006.01)
*F16H 53/06* (2006.01)

(56) References Cited

U.S. PATENT DOCUMENTS

| | | | | | |
|---|---|---|---|---|---|
| 1,936,973 | A * | 11/1933 | Switzer | ................... | B60N 2/34 297/54 |
| 4,322,151 | A * | 3/1982 | Weiss | ...................... | F16H 53/06 396/89 |
| 5,016,318 | A * | 5/1991 | Harris | ................. | E05D 15/0608 160/206 |
| 5,036,953 | A * | 8/1991 | Munz | ................... | B66B 13/305 187/334 |
| 5,038,824 | A * | 8/1991 | Hyde | ...................... | F16H 25/18 74/568 R |
| 5,461,829 | A * | 10/1995 | Lehto | ................. | E05D 15/1021 49/225 |
| 6,082,499 | A * | 7/2000 | O'Donnell | .............. | E05D 15/12 187/334 |
| 6,641,214 | B2 * | 11/2003 | Veneruso | ............. | B60N 2/0252 297/343 |
| 7,390,060 | B2 * | 6/2008 | Kristen | ................ | A47C 1/0352 297/343 |
| 8,955,178 | B2 * | 2/2015 | Robertson | ............ | A47C 20/041 5/613 |
| 9,248,066 | B2 * | 2/2016 | Tsukada | ................. | A61G 7/053 |
| 10,004,334 | B2 * | 6/2018 | Robertson | .............. | A47C 1/029 |
| 10,125,528 | B2 * | 11/2018 | Wypych | .............. | E05D 15/0652 |
| 10,427,794 | B2 * | 10/2019 | Erhel | ....................... | B60N 2/34 |
| 10,986,924 | B2 * | 4/2021 | Shibamoto | ............... | A47C 3/40 |
| 2005/0017561 | A1 * | 1/2005 | Burmeister | ............ | B60N 2/015 297/354.12 |
| 2007/0101540 | A1 * | 5/2007 | Martin | ................ | E05D 15/0634 16/97 |
| 2010/0308167 | A1 * | 12/2010 | Hawkins | .............. | B60N 2/2209 244/122 R |
| 2012/0038196 | A1 | 2/2012 | Lawson | | |
| 2014/0300161 | A1 * | 10/2014 | Beroth | ................... | B64D 11/06 297/340 |
| 2022/0306299 | A1 * | 9/2022 | Shiels | ................ | A47C 1/03294 |

FOREIGN PATENT DOCUMENTS

| | | | | |
|---|---|---|---|---|
| EP | | 1057725 | A2 | 12/2000 |
| EP | | 3118115 | B1 | 7/2019 |
| GB | | 2459606 | A | 11/2009 |
| SU | | 573390 | A1 | 9/1977 |
| WO | | 2008107689 | A1 | 9/2008 |
| WO | | 2008132481 | A2 | 11/2008 |
| WO | | 2015097630 | A1 | 7/2015 |
| WO | WO-2019197329 | A1 * | 10/2019 | ......... B64D 11/0639 |

OTHER PUBLICATIONS

United Kingdom Patent Application No. 1911277.0, Search Report, dated Jan. 31, 2020.

* cited by examiner

AIRCRAFT SEAT WITH CAM FOLLOWERS

CROSS-REFERENCE TO RELATED APPLICATIONS

This application is a national stage application of International Patent Application No. PCT/GB2020/051720, filed on Jul. 17, 2020, and titled "Aircraft Seat with Cam Followers," which is related to and claims priority to United Kingdom Patent Application No. 1911277.0, filed on Aug. 7, 2019, and titled "Aircraft Seat and Cam Followers," both of which are hereby incorporated by reference in their entireties.

FIELD OF THE INVENTION

The present invention concerns an aircraft seat. More particularly, but not exclusively, this invention concerns an aircraft seat with cam followers. The invention also concerns cam followers.

BACKGROUND OF THE INVENTION

A cam follower is often used in aircraft seats in order to help manipulate the aircraft seat as it moves between various different positions. The cam follower may be attached to, for example, the seat back or the seat pan, and control the angle of the seat back and/or seat pan as they are moved forwards or backwards, for example between an upright or bed position. Significant loads may be experienced by the cam follower, leading to wear which results in restorative maintenance or replacement being required. A cam follower often has internal bearings which emit swarf, further adding to the wear of the cam follower.

The present invention seeks to mitigate the above-mentioned problems. Alternatively or additionally, the present invention seeks to provide an improved cam follower arrangement.

SUMMARY OF THE INVENTION

The present invention provides, according to a first aspect, an aircraft seat, the aircraft seat comprising at least one moveable element, a cam follower arrangement associated with the moveable element, wherein the cam follower arrangement comprises a first cam follower and second cam follower attached to a common bogie.

Provision of a first cam follower and a second cam follower attached to a common bogie spreads the load experienced by each individual cam follower. As such, the wear on each individual cam follower is reduced. This reduction in wear may result in fewer maintenance tasks associated with the aircraft seat, and may make the aircraft seat more robust.

The moveable element may be a seat pan. The moveable element may be a seat back. The association of the cam follower with the moveable element may, for example, be a mechanical connection to a mounting point on the moveable element. The common bogie may be mechanically connected to the moveable element. The common bogie may be mechanically connected to the moveable element such that the common bogie is rotatable relative to the moveable element.

The cam follower may be arranged to follow a cam path. The cam path may form part of the aircraft seat chassis. The bogie may be rotatably connected to the moveable aircraft seat element.

According to a second aspect of the invention there is also provided a cam follower arrangement, the cam follower arrangement comprising a first cam follower and a second cam follower attached to a common bogie. The bogie may comprise a connector allowing rotational connection of the bogie to a moveable element, for example part of an aircraft seat unit. The first cam follower and second cam follower may be identical in construction. The first cam follower and second cam follower may comprise a common diameter. The first cam follower and second cam follower may be attached to the common bogie such that they are spaced no further apart than the common diameter. The spacing referred to is the spacing from the closest points of the two external perimeters of the first cam follower and second cam follower. The first cam follower and second cam follower may be located immediately adjacent to one another. Locating the first cam follower and second cam follower close together may provide a cam follower arrangement that is capable of following cam follower paths with tighter curvature than if the cam followers are located far apart.

It will of course be appreciated that features described in relation to one aspect of the present invention may be incorporated into other aspects of the present invention. For example, the first aspect of the invention may incorporate any of the features described with reference to the second aspect of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
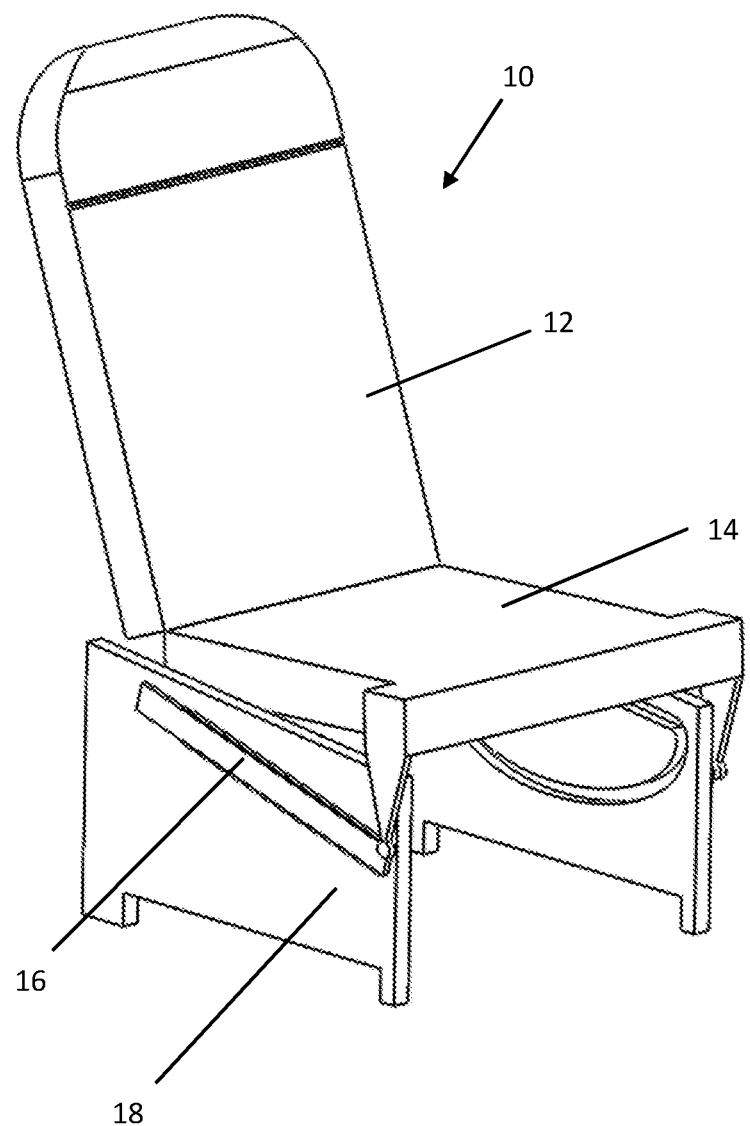
FIG. 1 shows a schematic view of an aircraft seat according to a first embodiment of the invention.

FIG. 1 shows an aircraft seat 10 comprising a seat back 12 and a seat pan 14. The seat back 12 and the seat pan 14 are pivotally connected to each other. The seat pan 14 is mounted to a first and second slide 16, the slides 16 located to either side of the aircraft seat 10. The slides 16 are mounted to a seat chassis 18. An actuator (not shown) is used to move the aircraft seat 10 between an upright position (for example, taxi, take off, and landing position—TTL) and a bed position. The aircraft seat 10 may also be moved into one or more seating positions between the upright position and bed position. The seat pan 14 includes a cam follower arrangement 20, with the cam follower arrangement 20 located within a cam path 22 provided by the seat chassis 18. The cam path 22 includes a curved section configured to cause the seat pan 14 to change angle as the seat pan is moved forwards and backwards by the slides 16.

Figure 2:
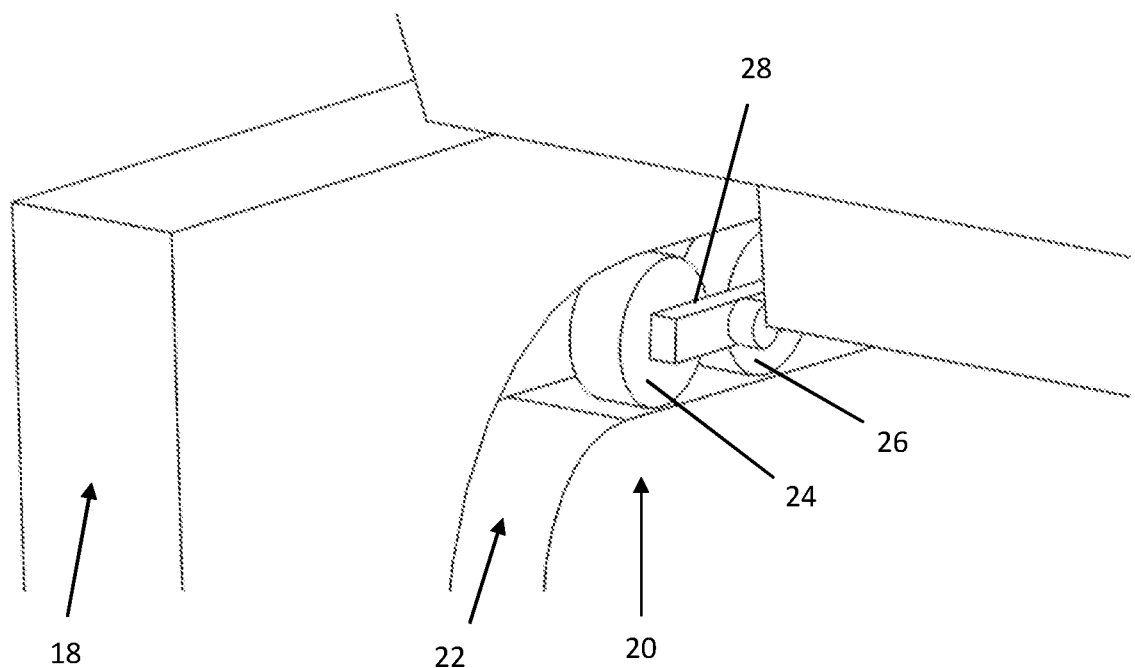
FIGS. 2 and 3 show a section of the aircraft seat comprising a cam follower arrangement according to the first embodiment of the invention.
Figure 3:
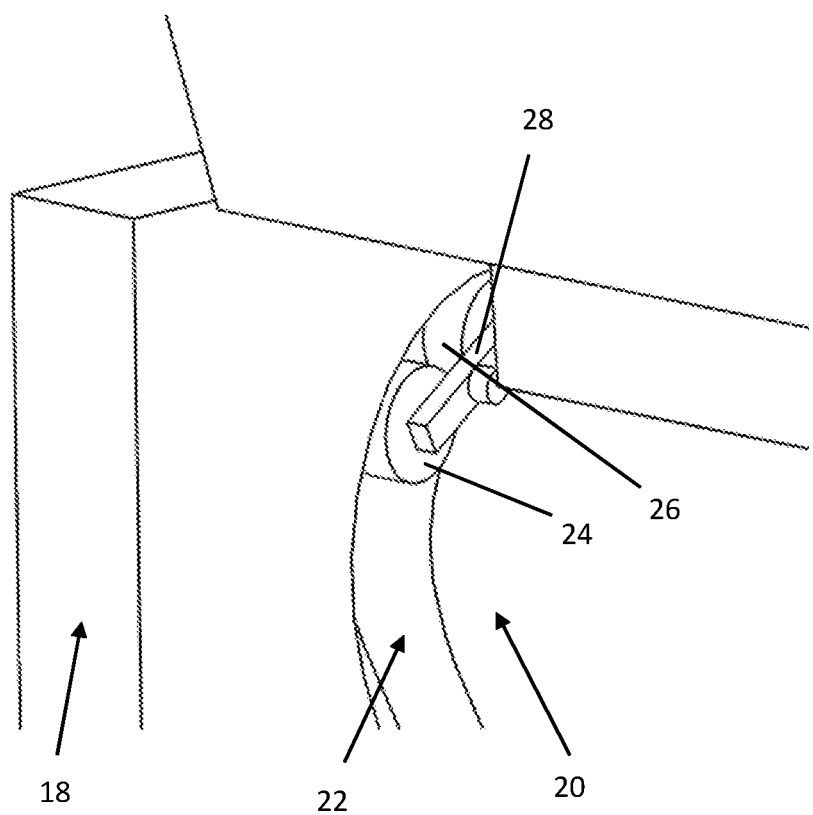
Figure 4:
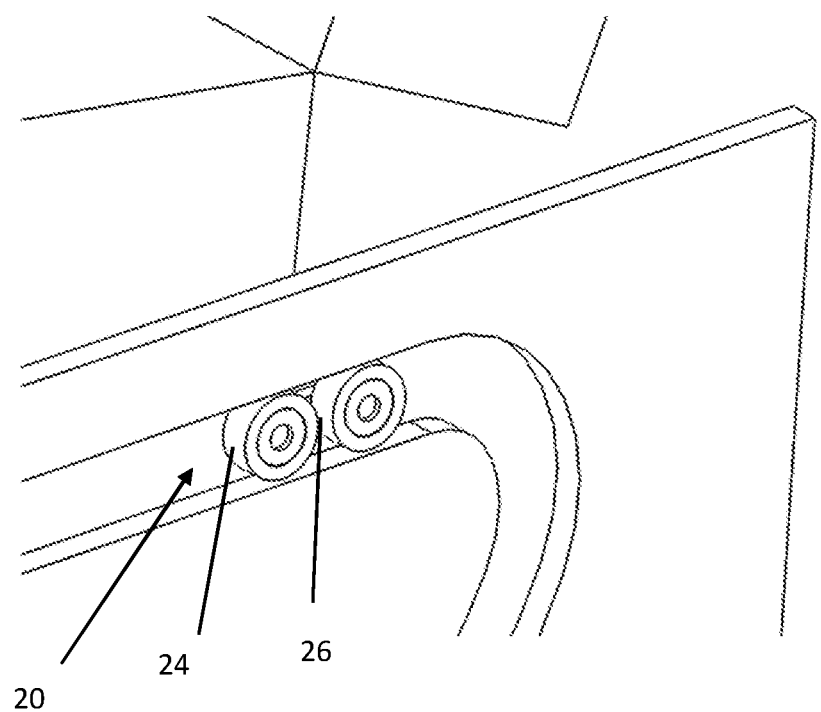
FIGS. 4 to 6 show the cam follower arrangement in different positions along a cam path.
Figure 5:
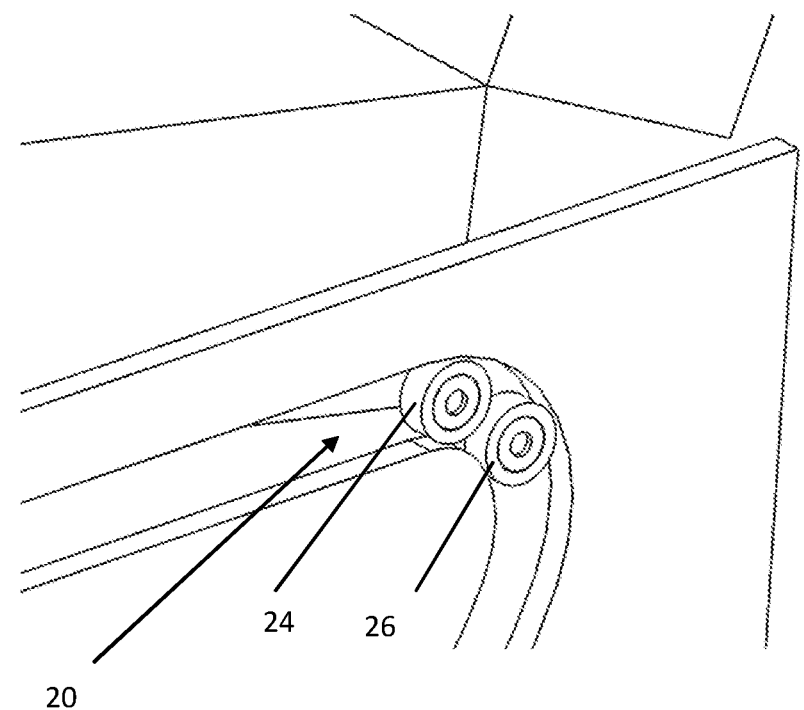
Figure 6:
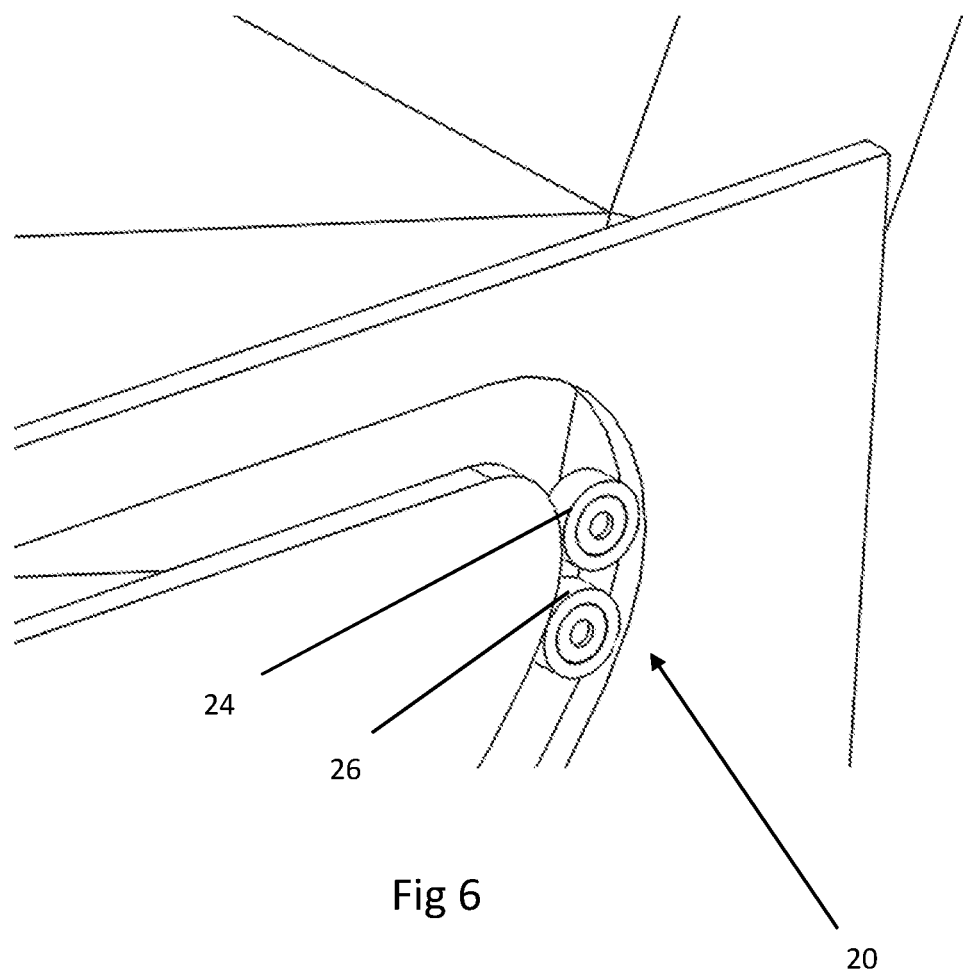
Figure 7:
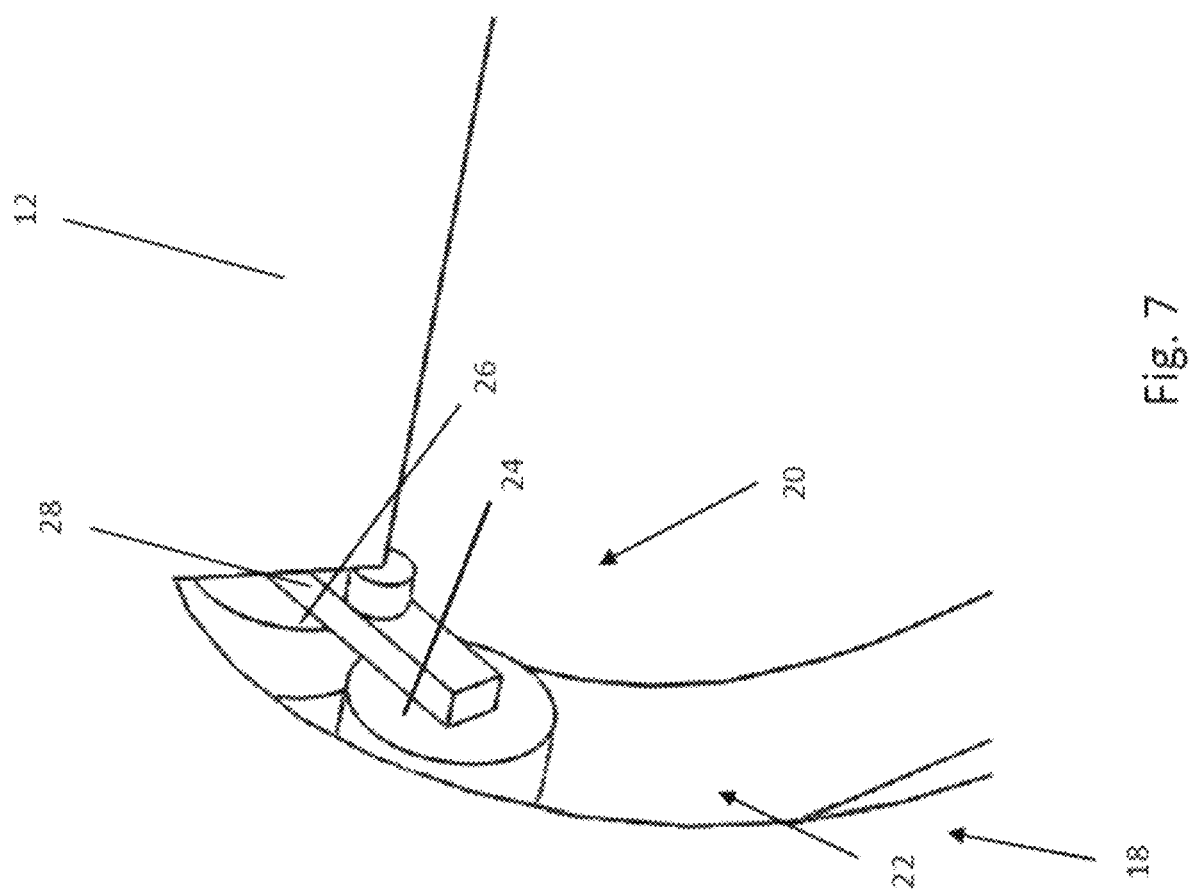
FIG. 7 shows a section of the aircraft seat comprising a cam follower arrangement mounted to a seat back according to an embodiment of the invention.

Further detail can be seen in FIG. 2, where the cam follower arrangement 20 comprises a first cam follower 24 and a second cam follower 26, each mounted to a bogie 28. The bogie 28 is rotatably mounted to the seat pan 14. The rotational connection to the seat pan 14 allows the cam follower arrangement 20 to rotate as required when moving around the curved section of the cam path. FIG. 3 shows the cam follower arrangement 20 in the curved section of the cam path 22. FIGS. 4 to 6 show how the rotation provided by the rotational connection of the bogie 28 to the seat pan 14 allows movement from the straight section of the cam path 22 to the curved section of the cam path 22.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft seat, the aircraft seat comprising: at least two moveable elements, and cam follower arrangement associated with the at least two moveable elements, wherein the cam follower arrangement comprises a first cam follower and a second cam follower, wherein the first cam follower and the second cam follower are attached to a common bogie, wherein the first cam follower and the second cam follower have a common diameter, wherein the first cam follower and the second cam follower are spaced apart no further than the common diameter, and wherein the bogie is connected to at least one of the two moveable elements and is rotatable with respect to that one moveable element when the bogie rotates about a cam path on a seat chassis which at least partially supports one of the at least two moveable elements.

2. An aircraft seat as claimed in claim 1, wherein the at least two moveable elements include a seat pan.

3. An aircraft seat as claimed in claim 1, wherein the at least two moveable elements include a seat back.

4. An aircraft seat as claimed in claim 1, wherein the first cam follower and the second cam follower are arranged to follow the cam path, the cam path forming part of the aircraft seat chassis.

5. An aircraft seat as claimed in claim 1, wherein the cam path is configured to cause at least one of the two moveable elements to move forward or backwards by one or more slides.

6. An aircraft seat as claimed in claim 1, wherein the cam path includes a curved section.

7. An aircraft seat as claimed in claim 6, wherein the curved section is configured to guide the bogie to a position where at least one of the two moveable elements is in a bed position.

* * * * *